United States Patent
Tsuji

(10) Patent No.: US 10,289,834 B2
(45) Date of Patent: May 14, 2019

(54) ACCOUNT AUTHORITY MANAGEMENT DEVICE AND ACCOUNT AUTHORITY MANAGEMENT METHOD FOR A COMPONENT MOUNTER RELATED APPLICATION

(71) Applicant: FUJI CORPORATION, Chiryu (JP)

(72) Inventor: Hisayuki Tsuji, Kariya (JP)

(73) Assignee: FUJI CORPORATION, Chiryu (JP)

( * ) Notice: Subject to any disclaimer, the term of this patent is extended or adjusted under 35 U.S.C. 154(b) by 231 days.

(21) Appl. No.: 15/122,217

(22) PCT Filed: Mar. 11, 2014

(86) PCT No.: PCT/JP2014/056376
§ 371 (c)(1),
(2) Date: Aug. 29, 2016

(87) PCT Pub. No.: WO2015/136630
PCT Pub. Date: Sep. 17, 2015

(65) Prior Publication Data
US 2016/0371483 A1    Dec. 22, 2016

(51) Int. Cl.
*G06F 21/45* (2013.01)
*G06F 21/12* (2013.01)
(Continued)

(52) U.S. Cl.
CPC .............. *G06F 21/45* (2013.01); *G06F 21/12* (2013.01); *G06F 21/604* (2013.01); *G06F 21/629* (2013.01)

(58) Field of Classification Search
CPC .................................. G06F 21/45; H04L 63/20
(Continued)

(56) References Cited

U.S. PATENT DOCUMENTS

| | | | |
|---|---|---|---|
| 6,574,656 B1 * | 6/2003 | Nagaoka | G06F 21/31 709/201 |
| 2005/0080909 A1 * | 4/2005 | Panasyuk | G06F 21/31 709/229 |

(Continued)

FOREIGN PATENT DOCUMENTS

| | | |
|---|---|---|
| JP | 2007-172280 A | 7/2007 |
| JP | 2014-41472 A | 3/2014 |

OTHER PUBLICATIONS

Extended European Search Report dated Sep. 26, 2017 in Patent Application No. 14885083.7.

(Continued)

*Primary Examiner* — David J Pearson
(74) *Attorney, Agent, or Firm* — Oblon, McClelland, Maier & Neustadt, L.L.P.

(57) ABSTRACT

Names of registered groups are displayed in a group name list section, and setting contents of authority for each function of a component mounting related application that is performable for a group selected from groups displayed in the table in the group name list section are displayed such that comparison between groups is possible. An administrator edits content for authority settings for each function while comparing between groups setting contents of authority for each function displayed in an account authority comparison display section. The administrator switches a display to and from a display all functions mode that displays content for authority settings by each function for all functions of the component related application such that comparison between groups is possible, and a display difference mode that displays setting contents only for functions for which the content for authority settings differ between groups such that comparison between groups is possible.

4 Claims, 3 Drawing Sheets

(51) Int. Cl.
*G06F 21/60* (2013.01)
*G06F 21/62* (2013.01)

(58) Field of Classification Search
USPC .................................................. 726/18, 27
See application file for complete search history.

(56) References Cited

U.S. PATENT DOCUMENTS

| | | | |
|---|---|---|---|
| 2006/0069915 A1 | 3/2006 | Koeda | |
| 2007/0143859 A1 | 6/2007 | Ogi et al. | |
| 2009/0055901 A1* | 2/2009 | Kumar | G06F 21/604 |
| | | | 726/4 |
| 2012/0096545 A1* | 4/2012 | Koeda | G06F 21/126 |
| | | | 726/19 |
| 2013/0117699 A1* | 5/2013 | Branson | G06F 3/0488 |
| | | | 715/769 |
| 2014/0337632 A1* | 11/2014 | Kimura | H04L 9/3265 |
| | | | 713/176 |

OTHER PUBLICATIONS

Gramur, "3 Drupal Modules to Help You Streamline Administrative Tasks" Retrieved from the Internet: URL: https://web.archive.org/web/20140227035328/http://lyemium.com/content/3-drupal-modules-help-you-streamline-administrative-tasks, XP055406542, Aug. 26, 2013, 2 Pages.

Massimo Manara, et al., "Comparing Authorization Roles to Check for Alignment Between Systems" 100 Things You Should Know About Authorizations in SAP, Retrieved from the Internet: URL:https://s3-eu-west-1.amazonaws.com/gxmedia.galileo-press.de/leseproben/2965/sappress_100_things_authorizations_in_sap.pdf, XP055406555, Dec. 31, 2012, pp. 168-169.

International Search Report dated Aug. 12, 2014 in PCT/JP2014/056376 filed Mar. 11, 2014.

* cited by examiner

ACCOUNT AUTHORITY MANAGEMENT DEVICE AND ACCOUNT AUTHORITY MANAGEMENT METHOD FOR A COMPONENT MOUNTER RELATED APPLICATION

TECHNICAL FIELD

The present application relates to an account authority management device and an account authority management method that manages each function of a component mounting related application that is performable by each group to which accounts with the same authority belong.

BACKGROUND ART

For production systems that mount components onto circuit boards using component mounters, various component mounting related applications are used. Component mounting related applications are, for example, applications for creating part data used for component image recognition, applications for specifying system settings, applications to assist production, applications for advancing and monitoring production, and applications for editing production jobs. At production sites, multiple operators (users) use these component mounting related applications to create part data for component image recognition, specify system settings, assist production, advance and monitor production, and edit production jobs.

As it is necessary for administrators to manage authority for each function of component mounting related applications that is performable by accounts to which each operator is assigned, it is known for administrators to manage authority for each function of component mounting related applications that is performable by each group to which accounts with the same authority belong (Refer to Patent Literature 1).

CITATION LIST

Patent Literature

Patent Literature 1: JP-A-2007-172280

SUMMARY

In a case in which an account that uses component mounting related applications is added, the administrator must set authority for each function of the component mounting related applications. Here, as the accounts (actually, the groups to which the accounts belong) increase, the administrator must perform work while memorizing the content for authority settings of other accounts (groups), which is not only extremely troublesome and time-consuming, but means that it is easy for setting mistakes to be made.

Thus, to solve these problems, the present disclosure provides an account authority management device and an account authority management method that reduces setting mistakes while also simplifying authority setting work by each function of component mounting related applications.

To solve the above problems, the present disclosure relates to technology for managing authority of each function of a component mounting related application that is performable by each group to which accounts with the same authority belong, the account authority management method for the component mounting related application comprising: displaying registered group names in a table in a group name list section; displaying content for authority settings for each function of the component mounting related application that is performable for multiple groups selected by an administrator from groups displayed in a table in the group name list section, on an account authority comparison display section lined up such that comparison between groups is possible; and editing content for authority settings for each function while an administrator compares between groups setting contents of authority for each function of the component mounting related application displayed in the account authority comparison display section.

With the present disclosure, because it is possible for an administrator to edit content for authority settings for each function while comparing between groups the content for authority settings of each function of the component mounting related application displayed in the account authority comparison display section, it is not necessary for the administrator to memorize setting content for authority settings of other accounts (groups), thus differences in authority settings between groups can be grasped easily, authority setting work is simplified, and setting mistakes are reduced.

Also, with the present disclosure, the administrator may switch a display on the account authority comparison display section to and from a display all functions mode that displays content for authority settings by each function of the component mounting related application for all functions of the component related application lined up such that comparison between groups is possible, and a display difference mode that displays setting contents only for functions for which the content for authority settings differs between groups lined up such that comparison between groups is possible. By switching from display all functions mode to display difference mode, it is possible to display setting contents only for functions for which the content for authority settings differs between groups lined up such that comparison between groups is possible, thus differences in authority settings between groups are easier to understand, and authority setting work becomes much simpler.

DESCRIPTION OF EMBODIMENTS

Embodiments of the present disclosure are described below. First, the system configuration of the account authority management device is described.

Figure 1:
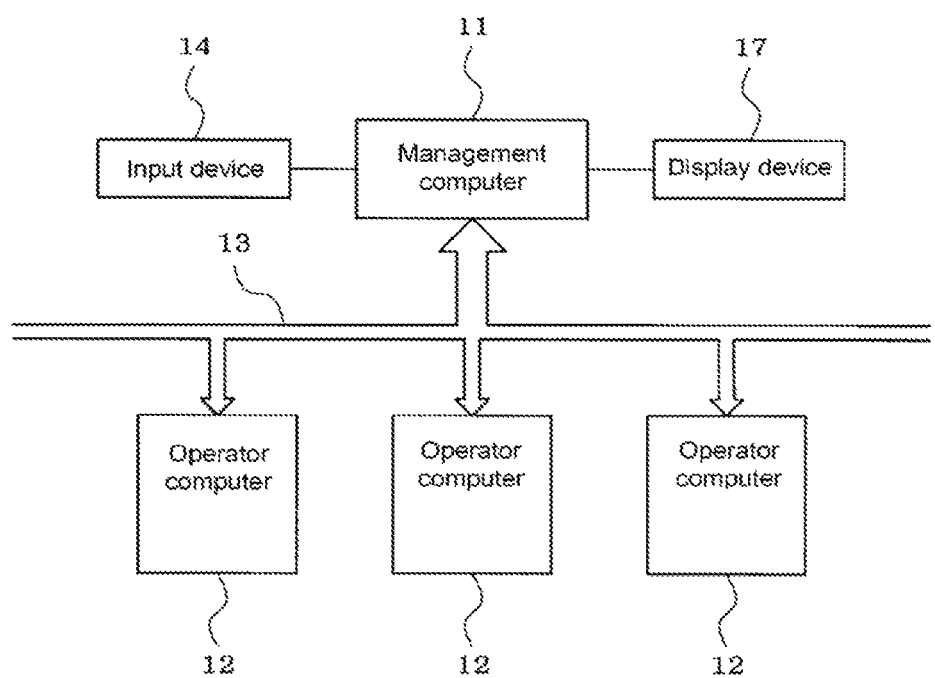
FIG. 1 is a block diagram showing a system configuration example of an account authority management device that is an embodiment of the present disclosure.

As shown in FIG. 1, administrator computer 11 that an administrator uses and one or multiple operator computers 12 that an operator assigned to a production system that mounts components on printed circuit boards using a component mounter uses are connected via network 13. Note that, the administrator computer may be shared by both the administrator and the operator.

Figure 2:
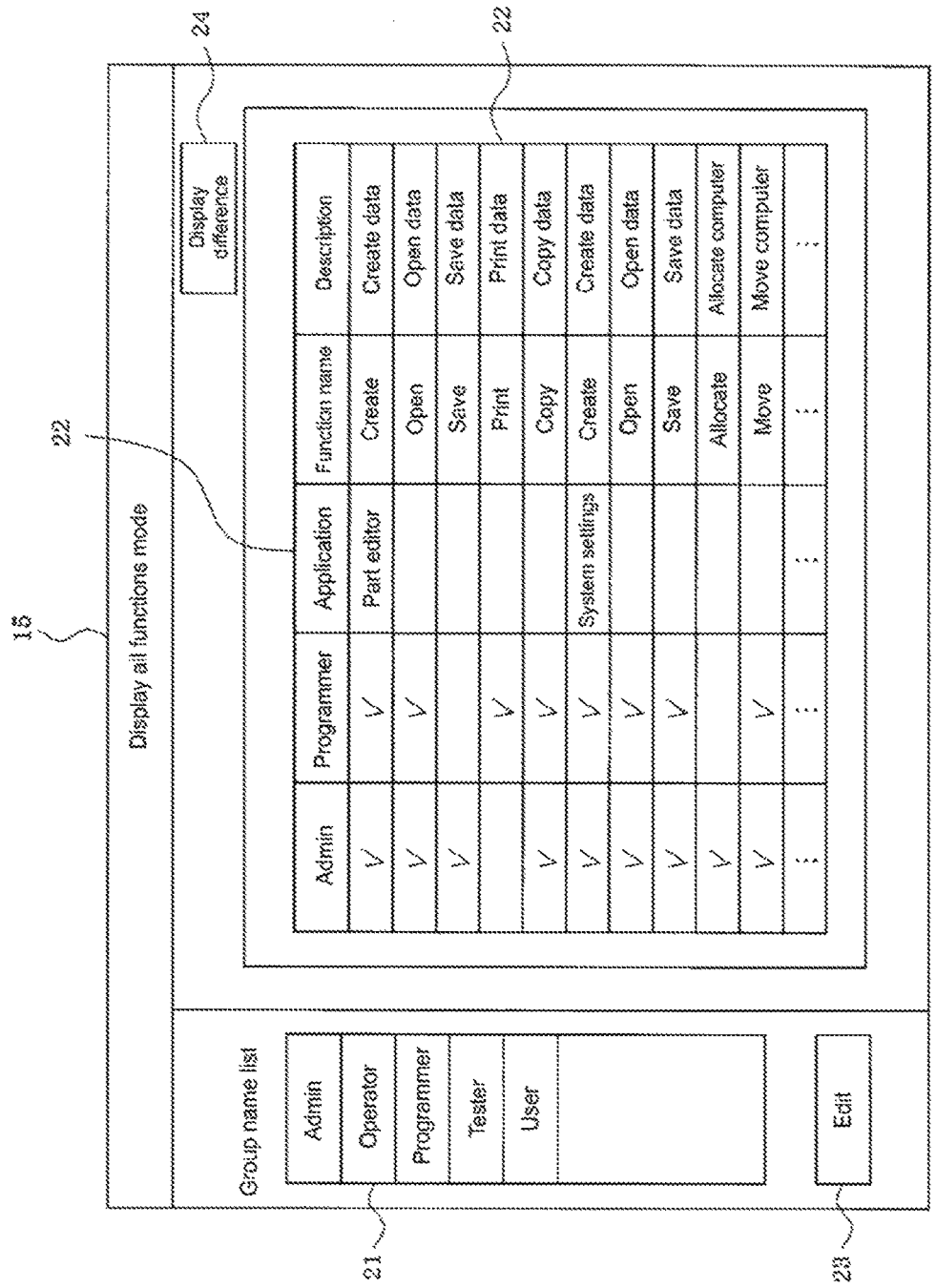
FIG. 2 shows the account authority setting work screen of display all functions mode.
Figure 3:
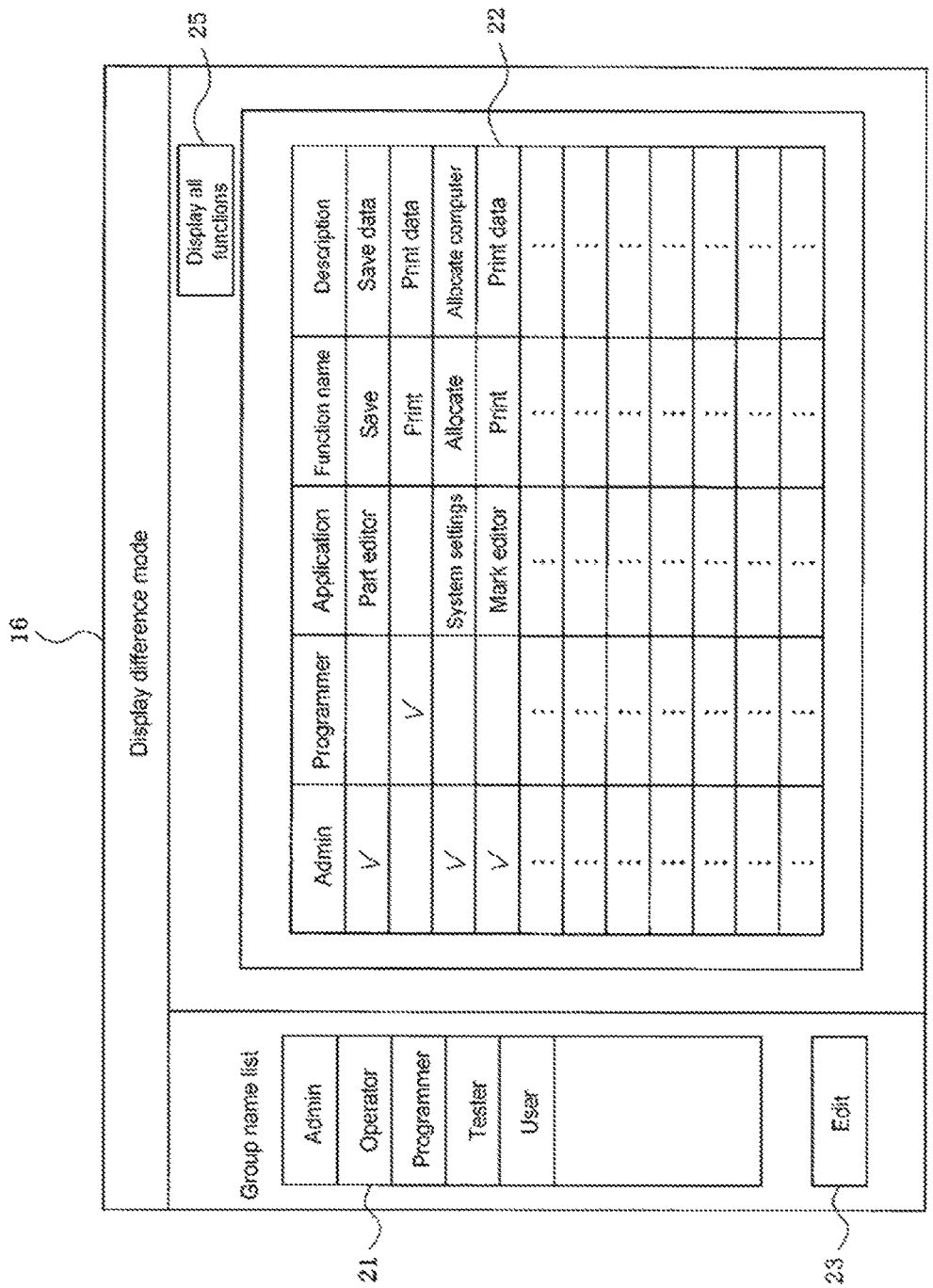
FIG. 3 shows the account authority setting work screen of display difference mode.

Administrator computer 11 is connected to input device 14, such as a keyboard, mouse, or touchscreen; display device 17 that switchably displays, for example, account authority setting work screen 15 of display all functions mode and account authority setting work screen 16 of display difference mode, which are shown in FIGS. 2 and 3 described later; and the like.

As shown in FIG. 2, provided in account authority setting work screen 15 of display all functions mode is group name list section 21 in which registered group names are displayed in a table, and account authority comparison display section 22 that displays content for authority settings for each function of the component mounting related application that is performable for multiple (for example, two) groups selected by an administrator by operation of input device 14 from groups displayed in the table in group name list section 21 lined up such that comparison between groups is possible.

Accounts each with the same authority belong to each of the groups displayed in the table in group name list section 21 (for example, Admin, Operator, Programmer, Tester, User). In the example of FIG. 2, from the groups displayed in the table in group name list section 21, Admin and Programmer are selected, and content for authority settings (has or does not have authority) for Admin and Programmer for each function of the component mounting related application that is performable are displayed in account authority comparison display section 22 lined up such that comparison between groups is possible. Component mounting related applications are, for example, applications for creating part data used for component image recognition (part editor), applications for specifying system settings, applications to assist production, applications for advancing and monitoring production, and applications for editing production jobs (job editor).

For example, functions of part editor include "Create", "Open", "Save", "Print", and "Copy", and functions of the application for specifying system settings are "Create", "Open", "Save", "Allocate", and "Move". Beside each function name is a description column that displays a simple description of each function.

Edit button 23 is provided in account authority setting work screen 15 of display all functions mode; when the administrator operates edit button 23 using input device 14, it is possible to edit the content for authority settings (has authority or does not have authority) for each function of a component mounting related application displayed in account authority comparison display section 22 by operating input device 14 while comparing between groups the content for authority settings for each function of component mounting related applications. For editing work of setting contents of authority, a check mark is entered in the input column for the existence of authority of each group for functions for which authority is given, and the input column is left blank for functions for which authority is not given.

Note that, each particular function of each application is also displayed in account authority comparison display 22 of account authority setting work screen 15 of display all functions mode, such that editing setting contents of authority can also be performed individually for particular functions of each application. In the example of FIG. 2, allocate and move are particular functions of system settings.

Display difference button 24 (display mode switching means) is provided on account authority setting work screen 15 of display all functions mode, and when the administrator uses input device 14 to operate (click, touch, or the like) display difference button 24, account authority setting work screen 15 of display all functions mode shown in FIG. 2 switches to account authority setting work screen 16 of display difference mode shown in FIG. 3. With account authority setting work screen 15 of display all functions mode that displays on account authority comparison display section 22 as shown in FIG. 2, content for authority settings by each function of the component mounting related application for all functions of the component related application are displayed lined up such that comparison between groups is possible; in contrast, with account authority setting work screen 16 of display difference mode that displays on account authority comparison display section 22 as shown in FIG. 3, setting contents only for functions for which the content for authority settings differ between groups are displayed lined up such that comparison between groups is possible.

Display all functions button 25 (display mode switching means) is provided on account authority setting work screen 16 of display difference mode, and when the administrator uses input device 14 to operate (click, touch, or the like) display all functions button 25, account authority setting work screen 16 of display difference mode shown in FIG. 3 switches to account authority setting work screen 15 of display all functions mode shown in FIG. 2. Also provided on account authority setting work screen 16 of display difference mode are group name list section 21 in which registered group names are displayed in a table, and edit button 23 used for editing the content for authority settings (has authority or does not have authority) for each function of the component mounting related application displayed in account authority comparison display section 22 via operation of input device 14.

With the embodiment described above, because it is possible for an administrator to edit content for authority settings for each function while comparing the content for authority settings between groups for each function of the component mounting related application displayed in the account authority comparison display section, it is not necessary for the administrator to memorize content for authority settings of other accounts (groups), thus differences in authority settings between groups can be grasped easily, authority setting work is simplified, and setting mistakes are reduced.

Further, by switching from display all functions mode to display difference mode, it is possible to display setting contents only for functions for which the content for authority settings differ between groups lined up such that comparison between groups is possible, thus differences in authority settings between groups are easier to understand, and authority setting work becomes much simpler.

Note that, the present disclosure is not limited to the above embodiment and various changes may be implemented that do not depart from the scope of the disclosure, for example, the configuration may be such that one of the display all functions mode and the display difference mode is omitted, and the design of each section of account authority setting work screens 15 and 16 may be changed.

REFERENCE SIGNS LIST

11: administrator computer; 12: operator computer; 14: input device; 15: account authority setting work screen of display all functions mode; 16: account authority setting work screen of display difference mode; 17: display device; 21: group name list section; 22: account authority comparison display section; 23: edit button; 24: display difference button (display mode switching means); 25: display all functions button (display mode switching means)

The invention claimed is:

1. An account authority management device for a component mounting related application that manages authority of each function of the component mounting related application, the account authority management device comprising:
- circuitry configured to
  - control a display to display registered group names in a first table, the registered group names including a plurality of groups, each group of the plurality of the groups representing a plurality of accounts with a same authority;
  - control the display to display a second table including contents for authority settings for each function of the component mounting related application that is performable by multiple groups selected by an administrator from the plurality of groups in the first table such that comparison between the plurality of groups is possible; and
  - receive an input from the administrator to edit the content for the authority settings for each function of the component mounting related application in the second table.

2. The account authority management device for the component mounting related application according to claim 1, wherein the circuitry is further configured to
receive another input from the administrator or another administrator to switch the display from a display all functions mode that displays the content for the authority settings of each function of the component mounting related application to a display difference mode that displays a portion of the contents only for functions for which the content for the authority settings differs between the plurality of groups.

3. An account authority management method for a component mounting related application for managing authority of each function of the component mounting related application, the account authority management method comprising:
- controlling a display to display registered group names in a first table, the registered group names including a plurality of groups, each group of the plurality of the groups representing a plurality of accounts with a same authority;
- controlling the display to display a second table including content for authority settings for each function of the component mounting related application that is performable by multiple groups selected by an administrator from the plurality of groups displayed in the first table such that comparison between the plurality of groups is possible; and
- receiving an input from the administrator to edit, by circuitry of an account authority management device, the content for the authority settings for each function of the component mounting related application in the second table.

4. The account authority management method for the component mounting related application according to claim 3, further comprising:
receiving another input from the administrator or another administrator to switch the display from a display all functions mode that displays the content for the authority settings of each function of the component mounting related application to a display difference mode that displays a portion of the contents only for functions for which the content for the authority settings differs between the plurality of groups.

* * * * *